May 23, 1939.   W. R. GORHAM   2,159,694
DRIVING GEAR
Filed May 12, 1937   5 Sheets-Sheet 2
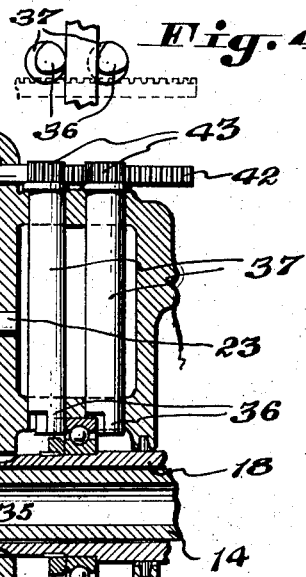
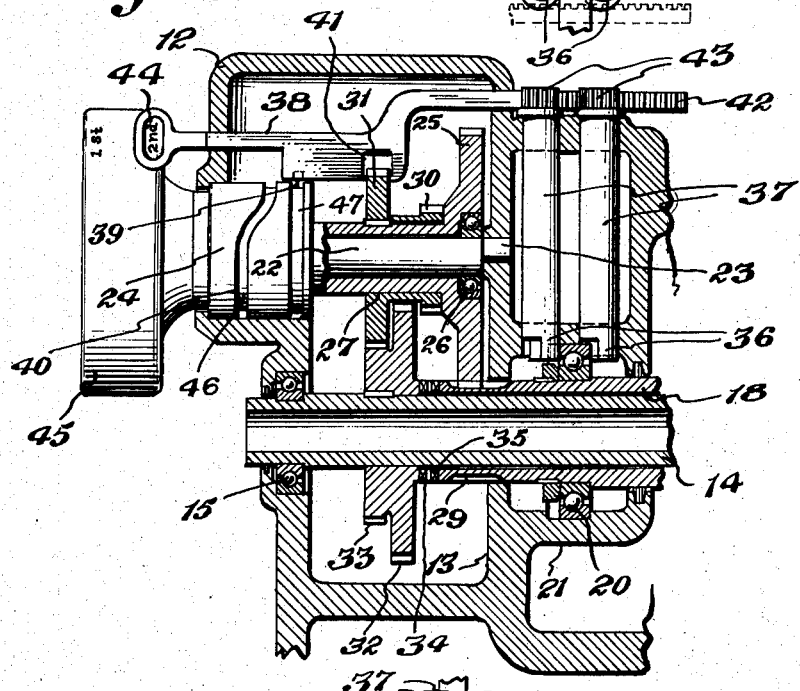
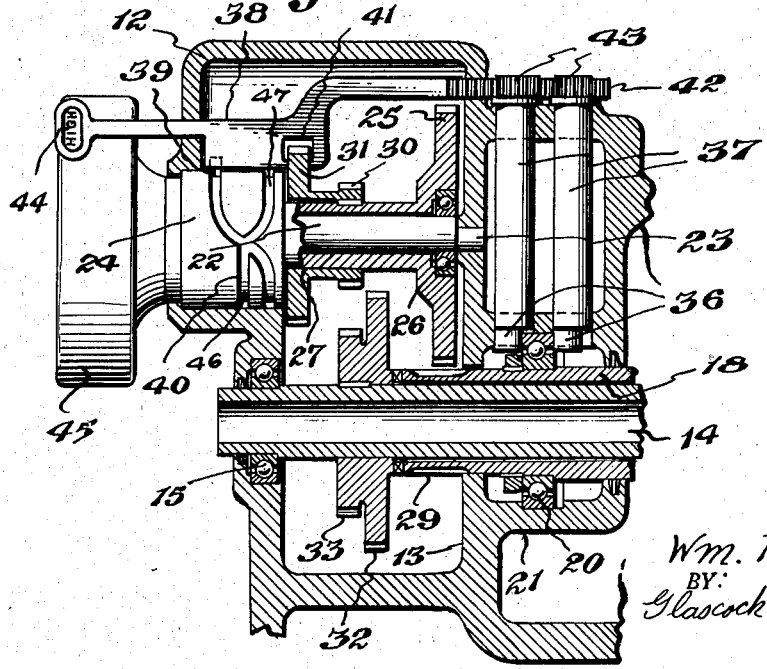
INVENTOR,
Wm. R. Gorham
BY: Glascock Downing & Seebold
ATTORNEYS.

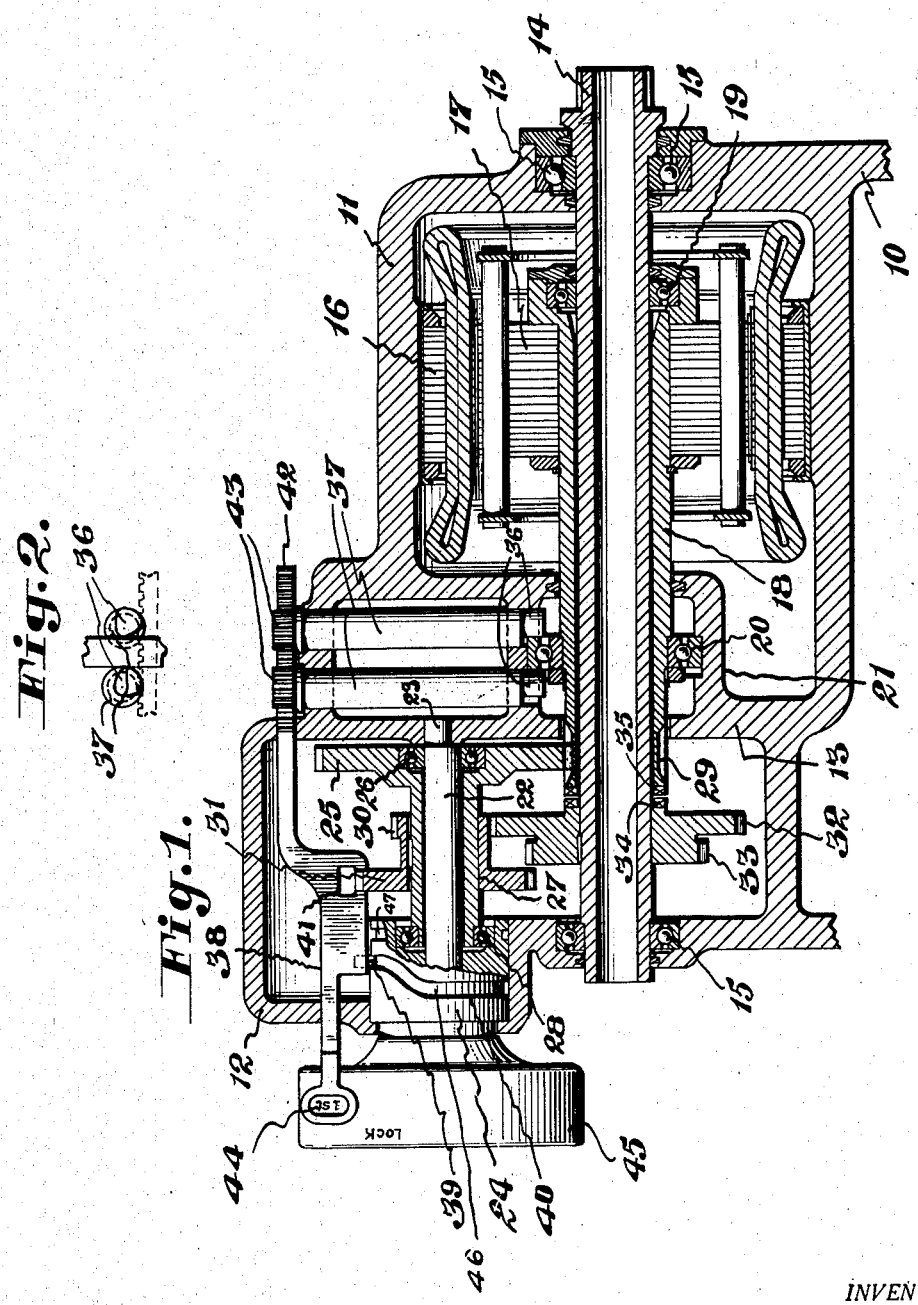

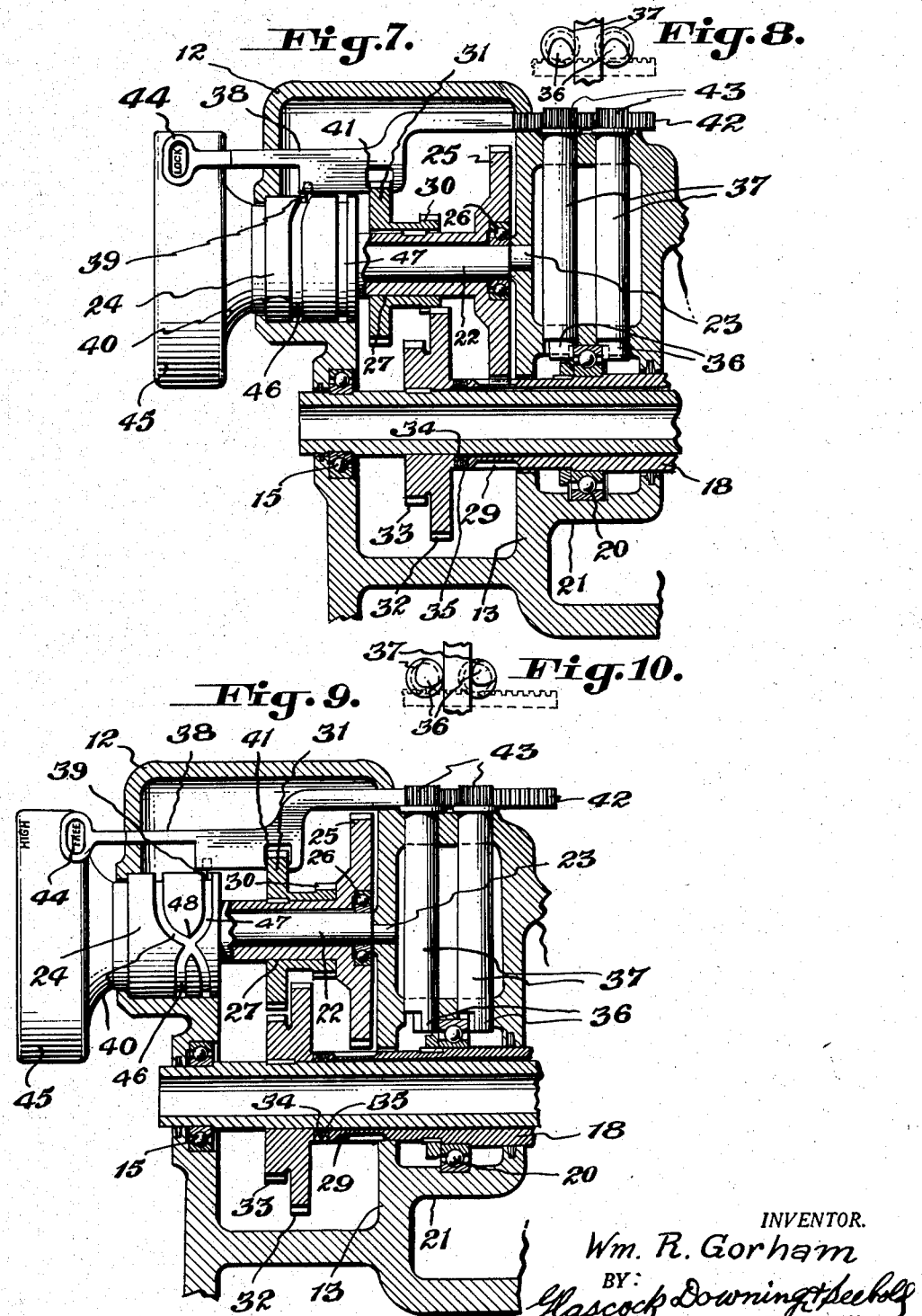

May 23, 1939.  W. R. GORHAM  2,159,694
DRIVING GEAR
Filed May 12, 1937   5 Sheets-Sheet 4

INVENTOR,
Wm. R. Gorham
BY:
Glascock Downing Seebold
ATTORNEYS.

May 23, 1939.  W. R. GORHAM  2,159,694
DRIVING GEAR
Filed May 12, 1937  5 Sheets-Sheet 5

INVENTOR.
Wm. R. Gorham
BY
Glascock Downing
ATTORNEYS.

Patented May 23, 1939

2,159,694

UNITED STATES PATENT OFFICE 2,159,694

DRIVING GEAR

William R. Gorham, Shibuya-ku, Tokyo, Japan

Application May 12, 1937, Serial No. 142,269
In Japan February 6, 1937

11 Claims. (Cl. 74—333)

This invention relates to improvements in driving gear of the variable speed reduction type which is more particularly designed for driving the tool spindles of turret lathes.

The invention has for its object to provide a driving gear wherein the driving motor, clutch and reduction gear are of simple construction and compactly arranged for convenient adjustment and economical manufacture and assembly.

Further objects and advantages will be apparent from the following specification considered in connection with the accompanying drawings, in which:

Figure 1 is a longitudinal sectional view through the complete driving gear including the driving motor, clutch device and variable speed transmission mechanism showing the drive gear adjusted for low speed transmission.

Fig. 2 is a detail view showing the position of the clutch control device in the position it assumes with the driving gear adjusted for low speed transmission.

Fig. 3 is a fragmentary detail section of the driving gear adjusted for second or intermediate gear transmission.

Fig. 4 is a view similar to Fig. 2 showing the clutch adjusting device and the position it occupies when the driving gear is in the condition shown in Fig. 3.

Fig. 5 is a view similar to Fig. 3 showing the clutch engaged for high speed transmission.

Fig. 6 is a view similar to Figs. 2 and 4 showing the clutch control device in the position it occupies when the clutch is fully engaged.

Fig. 7 is a view similar to Figs. 3 and 5 showing the clutch and variable speed transmission mechanism in locked position.

Fig. 8 is a detail view of the clutch control device showing the position of the latter with the parts of the driving gear adjusted as shown in Fig. 7.

Fig. 9 is a view similar to Fig. 7 showing the "free" position of the driving gear with the gear wheels of the intermediate train radially displaced from meshing position.

Fig. 10 is a detail view of the clutch control device showing its position when the parts of the driving gear occupy the position shown in Fig. 9.

Figs. 13 and 14 are detail sectional views of the modification shown in Fig. 11.

Figure 11:
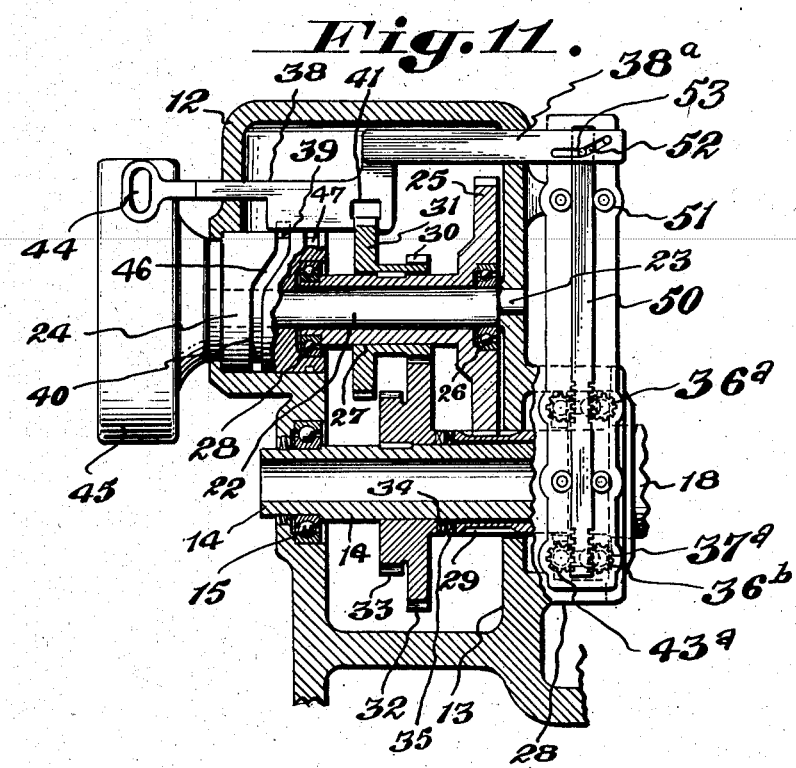
Fig. 11 is a fragmentary view similar to Fig. 1 showing a modification of the clutch control device.

Referring to the drawings in detail 10 designates a portion of the machine frame upon which is mounted the motor casing 11 and the change speed gear and clutch casing 12, the two casings being separated by a partition wall 13. The machine spindle 14 passes longitudinally through both casings 11 and 12 and is rotatably supported in bearings 15 provided in the end walls of the casings.

An electric motor including a stator 16 and a rotor 17 is mounted in the casing 11, the rotor being supported on the hollow drive shaft 18 and telescopically arranged over the spindle 14 and located between the bearings 15. The shaft 18 is rotatably mounted at one end in a ball bearing 19 the outer race of which is fixed to the drive shaft 18 and the inner race of which is slidable along the spindle 14 to accommodate axial movement of the drive shaft. Adjacent its opposite end, the drive shaft 18 is mounted in a bearing 20 the inner race of which is secured against axial movement on the shaft 18 and the outer race being arranged to move axially in a guide 21 forming part of the partition wall 13. Owing to the arrangement of the races of the ball bearings 19 and 20, the drive shaft 18 is mounted for rotary and axial movements on the spindle 14.

A supporting shaft 22 for the intermediate gear wheels is arranged in the gear casing 12 and is eccentrically disposed with respect to a trunnion 23 journalled in the partition wall 13. The opposite end of the eccentric shaft 22 is rigidly attached to a cam cylinder 24 which is rotatably mounted in the casing 12 about the axis of the trunnion 23. An intermediate gear wheel 25 is supported by a bearing 26 on one end of the eccentric shaft 22 and is provided with a hub-like extension 27 rotatably mounted in the cylinder 24 by bearings 28. The gear wheel 25 meshes with a small driving pinion 29 rigid with the drive shaft 18 and having the teeth thereof extended in the axial direction to accommodate longitudinal movement of the drive shaft relatively to the gear wheel 25.

Low and second speed gear wheels 30 and 31 rigidly coupled in spaced relation are slidably keyed on the hub 27 and are respectively engageable with the driven gear wheels 32 and 33 disposed in close relation and rigidly fixed to the machine spindle 14.

The adjacent faces of the gear wheel 32 and the drive shaft 18 are formed with clutch teeth 34 and 35 which, when engaged by axial movement of the drive shaft, provide a direct drive between said drive shaft and the machine spindle 14 for rotating the latter at the same speed as the rotor 17.

Engagement and disengagement of the clutch teeth 34—35 is effected by a pair of cams 36 carried by shafts 37 suitably journalled in the gear casing. The outer race of the drive shaft bearing 20 is confined between the cams 36 and incident to the synchronized movement of the latter, said bearing together with the drive shaft are moved axially.

The combined gear shifting and clutch control device includes a control rod 38 slidably mounted in the wall of the casing 12 and provided with a pivoted follower 39 engaging in the cam groove 40 of the cylinder 24. The control rod 38 is formed with a recess 41 receiving the intermediate gear wheel 31 and adapted, through longitudinal movement of said rod, to shift the gear wheels 30 and 31 in the axial direction, the recess 41 being of sufficient depth to accommodate the radial displacement of the gear wheels 30 and 31 which is effected by rotation of the eccentric shaft 22.

One end of the control rod 38 is extended externally of the casing and provided with rack teeth 42 meshing with the pinions 43 carried by the shafts 37 whereby synchronous movement is imparted to said shafts and the cams 36 fixed thereto during sliding movement of the control rod. The opposite end of the control rod is also extended externally of the casing and is provided with an inspection slot 44.

Figure 12:
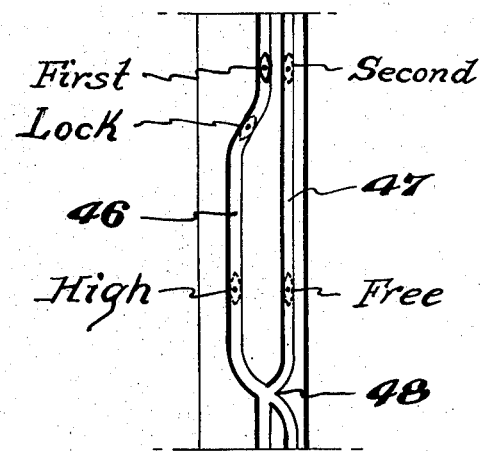
Fig. 12 is a plan development of the surface of the cylinder having the cam groove therein.
Figure 15:
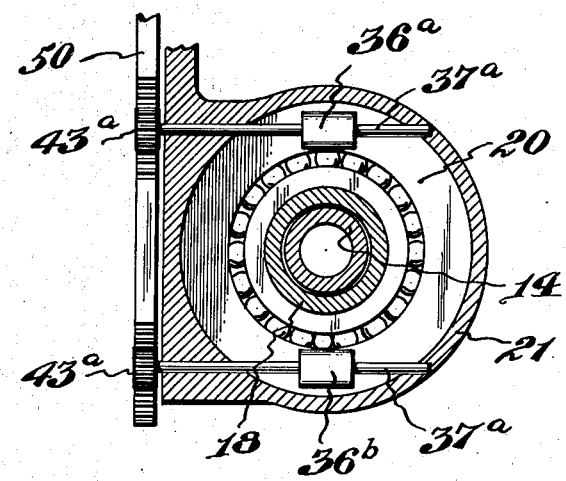

The cam cylinder 24 is provided with an adjusting knob 45 having appropriate legends thereon for indicating the various positions of the gear, such, for instance, as "First", "Second", "High", "Free" and "Lock". These legends are so arranged circumferentially about the knob 45 that when the cam cylinder is moved to a position corresponding thereto, the related legend is disposed in registration with and visible through the slot 44 in the control rod 38. Fig. 12 shows a plan development of the surface of the cam cylinder which consists of two groove parts 46 and 47 which are crossed at 48 whereby the follower 39 is guided from one groove part to the other during rotation of the cam cylinder. For convenience of reference the various positions which the follower 39 occupies in the grooves 46 and 47 have been indicated in Fig. 12 by the above legends and the positions of the follower indicated in dotted lines.

As shown in Fig. 5, the gear is adjusted for "high" speed, that is to say, the intermediate gear wheels 30 and 31 are moved axially and radially out of mesh with the driven gears 32 and 33 and the cams 36 have been actuated by the rack 42 and pinions 43 so as to displace the drive shaft 18 axially thereby engaging the clutch members 34 and 35 and establishing a direct driving connection between the drive shaft and the machine spindle 14. In this position, the eccentric shaft 22 is turned into such angular position that the large intermediate gear 25 is moved radially out of mesh with the driving pinion 29 and thus the entire set of intermediate gear wheels 30 and 31 are moved axially and machine spindle. Also in this position of the gear, the control rod 38 occupies its extreme left-hand position and owing to the arrangement of the cams 36 they act on the outer race of the bearing 20 to displace the latter axially together with the drive shaft 18 and thereby engage the clutch 34—35. In all other adjustments of the reduction gear with the exception of the "lock" position, the cams 36 are so disposed as to retain the drive shaft 18 in its right-hand position so that the clutch members 34—35 are disengaged.

When the knob 45 is turned to "lock" position the follower 39 occupies the position indicated in Fig. 12 and the parts of the reduction gear are disposed as shown in Fig. 7. In this condition, the clutch members 34 and 35 remain partially engaged and the eccentric shaft 22 is turned to a position in which the intermediate gear wheel 30 meshes with the driven gear wheel 32, the axial displacement of the gear 30 necessary for effecting this engagement having been imparted to the gear set 30—31 by the longitudinal movement of the control rod 38 in following inclination of the cam groove 46. The position of the cams 36 for this adjustment is shown in Fig. 8.

By a further slight displacement of the knob 45 and cam cylinder, the follower 39 moves the control rod 38 to a position in which the intermediate gear wheel 30 is in full mesh with the driven gear wheel 32, as shown in Fig. 1. During this longitudinal movement of the rod 38, the cams 36 are turned to the position shown in Fig. 2 in which the drive shaft 18 is so displaced as to completely disengage the clutch members 34 and 35. In this low speed adjustment, the motion of the drive shaft 18 is transmitted to the intermediate gear wheel 30 through the drive pinion 39 and gear wheel 25 to the spindle 14 through the gear wheel 32.

To adjust the reduction gear for "second" or intermediate speed, the knob 45 is turned to the position shown in Fig. 3 in which the follower 39 occupies a position in the cam groove 47 and thereby positions the eccentric shaft 22 to move the gear wheels 30 and 31 radially into the plane of mesh with the gear wheels 32 and 33. The axial movement imparted to the gear wheel 31 by the displacement of the control rod 38 moves it into mesh with the gear wheel 33, the gear wheel 32 occupying a position between the gear wheels 30 and 31. With the parts in this position the cams 36 obtain the position shown in Fig. 4 in which the drive shaft is still held in a position to disengage the clutch members 34 and 35. According to this adjustment, the movement of the drive shaft 18 is transmitted through the drive pinion 29, gear wheels 25, 31 and 33 to the machine spindle 14.

By turning the cam cylinder to the position shown in Fig. 9, the eccentric shaft 22 is so adjusted as to radially displace the gear wheels 25, 30 and 31 out of the plane of mesh with the related gear wheels and at the same time the cams 36 occupy the position shown in Fig. 10 whereby the motor and drive shaft 18 are wholly disconnected from the reduction gear.

Figure 14:
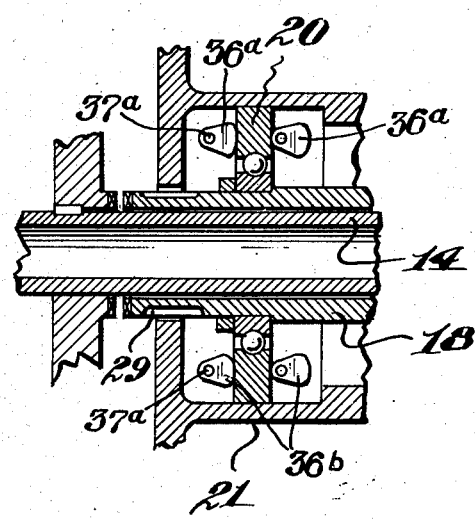

According to the modification of the invention illustrated in Figs. 11, 13 and 14, two pairs of cams 36a and 36b are arranged to reciprocate the shaft 18 and thereby engage and disengage the clutch 34 and 35. One cam of each pair is engaged with one side face of the outer ring of the bearing 20 at diametrically opposite points and the other cams are engaged at corresponding points with the opposite side faces of said ring. The cams are carried by shafts 37a each provided with a gear wheel 43a. The oppositely toothed rack bar 50 is mounted to slide vertically in guides 51 and the lower toothed end thereof is arranged between and in mesh with the gear wheels 43a of the pairs of cams. The control rod 38a is provided with a cam slot 52 receiving a pin 53 carried by the rack 50 and is so shaped that in all positions of the change speed gear with the exception of those indicated in Figs. 5 and 7 the rack 26 is maintained in such position as to maintain the clutch member 35 disengaged from the clutch member 34.

What I claim is:

1. In a driving gear, a spindle, a driving motor arranged coaxially about said spindle and including a rotor, a hollow shaft receiving said spindle, a clutch device for directly coupling the hollow shaft with the spindle, a change speed mechanism for coupling the hollow shaft with the spindle and including movable gear wheels for varying the speed ratios of the hollow shaft and spindle, means common to the gear wheels and the clutch device for adjusting the change speed mechanism for different driving speeds and for engaging said clutch, said common means including a single manipulating member, said manipulating member being rotatable.

2. In a driving gear, a spindle, a driving motor arranged coaxially about said spindle and including a rotor, a hollow shaft receiving said spindle, a clutch device for directly coupling the hollow shaft with the spindle, a change speed mechanism for coupling the hollow shaft with the spindle and including movable gear wheels for varying the speed ratios of the hollow shaft and spindle, means common to the gear wheels and the clutch device for adjusting the change speed mechanism for different driving speeds and for engaging said clutch, said common means including a single manipulating member, and a control rod actuated thereby, said manipulating member being rotatable and said control rod being slidable, one end of the rod moving across said manipulating member during rotation of the latter, and means on said manipulating member coacting with said rod to indicate the condition of the change speed mechanism and clutch device.

3. In a driving gear, a spindle, a driving motor arranged coaxially about said spindle and including a rotor, a hollow shaft receiving said spindle, a clutch device for directly coupling the hollow shaft with the spindle, a change speed mechanism for coupling the hollow shaft with the spindle and including movable gear wheels for varying the speed ratios of the hollow shaft and spindle, means common to the gear wheels and the clutch device for adjusting the change speed mechanism for different driving speeds and for engaging said clutch, said common means including a single manipulating member, and a control rod actuated thereby, and mutually coacting means on the manipulating member and control rod for indicating the condition of the change speed mechanism and the clutch device.

4. In a driving gear, a machine spindle, a hollow shaft receiving said spindle, a set of intermediate gear wheels mounted for axial and radial movement, a driving connection between the hollow shaft and said gear wheels, gear wheels on the spindle selectively engageable by the gear wheels of said set, and a single control member for imparting combined axial and radial movement to said gear set to move the latter toward and away from the second mentioned gear wheels in both radial and axial planes.

5. In a driving gear, a machine spindle, a hollow shaft receiving said spindle, a set of intermediate gear wheels, a driving connection between the hollow shaft and said gear wheels, gear wheels on the spindle selectively engageable by the gear wheels of said set, an eccentric support for said gear set adapted during rotation to move the gear wheels of said set radially with relation to the second mentioned gear wheels, means for shifting said set of gear wheels axially into engagement with either of the second mentioned gear wheels, and a single control member for actuating the shifting means and the eccentric support.

6. In a driving gear, a machine spindle, a hollow shaft receiving said spindle, a set of intermediate gear wheels, a driving connection between the hollow shaft and said gear wheels, gear wheels on the spindle selectively engageable by the gear wheels of said set, an eccentric support for said gear set adapted during rotation to move the gear wheels of said set radially with relation to the second mentioned gear wheels, means for shifting said set of gear wheels axially into engagement with either of the second mentioned gear wheels and a single control member for actuating the shifting means and the eccentric support, said single control member including a cylinder having a cam groove therein for actuating said shifting member and locking the latter in adjusted position.

7. In a driving gear, a machine spindle, a hollow shaft receiving said spindle, a set of intermediate gear wheels, a driving connection between the hollow shaft and said gear wheels, gear wheels on the spindle selectively engageable by the gear wheels of said set, an eccentric support for said gear set adapted during rotation to move the gear wheels of said set radially with relation to the second mentioned gear wheels, means for shifting said set of gear wheels axially into engagement with either of the second mentioned gear wheels, and a single control member for actuating the shifting means and the eccentric support, said control member including a cylinder having crossed cam grooves therein consisting of straight and inclined portions and a follower carried by said shifting means engaged in and operable by said cam grooves.

8. In a driving gear, a machine spindle, a hollow motor shaft receiving said spindle and axially and rotatably mounted thereon, a clutch device for coupling said shaft with said spindle, and means for moving said shaft axially to engage and disengage said clutch, the last mentioned means including a pair of cam members engaging opposite sides of a part of said shaft, and means for moving said cams in synchronism in either direction to move said shaft in one direction or the other to engage and disengage the clutch device.

9. In a driving gear, a machine spindle, a hollow motor shaft receiving said spindle, and axially and rotatably mounted thereon, a clutch device for coupling said shaft with said spindle, and means for moving said shaft axially to engage and disengage said clutch, the last mentioned means including a pair of cam members engaging opposite sides of a part of said shaft, and means for moving said cams in synchronism in either direction to move said shaft in one direction or the other to engage and disengage the clutch device, said moving means including a rack and pinion device.

10. In a driving gear, a machine spindle, a hollow motor shaft receiving said spindle and axially and rotatably mounted thereon, a clutch device for coupling said shaft with said spindle, and means for moving said shaft axially to engage and disengage said clutch, the last mentioned means including a pair of cam members engaging opposite sides of a part of said shaft, and means for moving said cams in synchronism in either direction to move said shaft in one direction or the other to engage and disengage the clutch device, the last mentioned means including a sliding rod and a rack and pinion device connecting said rod with said cam members.

11. A driving gear as claimed in claim 8 characterized by the provision of a change speed mechanism for connecting the hollow shaft with the spindle, said means for moving the cams including a control rod, said control rod engaging said change speed mechanism for adjusting the latter, and a single manipulating member for actuating the control member.

WILLIAM R. GORHAM.